United States Patent
Watanabe et al.

(10) Patent No.: US 7,355,929 B2
(45) Date of Patent: Apr. 8, 2008

(54) MAGNETO-OPTICAL DISK AND RECORDING AND/OR REPRODUCING METHOD AND RECORDING AND/OR REPRODUCING APPARATUS USING THE MAGNETO-OPTICAL DISK

(75) Inventors: Makoto Watanabe, Miyagi (JP); Kazutomo Miyata, Miyagi (JP); Teruyuki Ota, Miyagi (JP); Minoru Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 10/825,264

(22) Filed: Apr. 15, 2004

(65) Prior Publication Data
US 2004/0264305 A1 Dec. 30, 2004

(30) Foreign Application Priority Data
Apr. 22, 2003 (JP) ............ P2003-117026

(51) Int. Cl.
*G11B 11/00* (2006.01)
(52) U.S. Cl. ................. 369/13.38; 369/275.1
(58) Field of Classification Search ............ 369/13.35, 369/13.38, 13.42, 13.54, 13.55, 53.21, 59.25, 369/44.26, 47.12, 59.24, 275.1, 110, 116; 428/817, 821, 694 ML, 694 MM
See application file for complete search history.

(56) References Cited

U.S. PATENT DOCUMENTS

| | | | |
|---|---|---|---|
| 5,623,458 A | | 4/1997 | Matsumoto et al. |
| 6,052,465 A | * | 4/2000 | Gotoh et al. ............. 369/53.21 |
| 6,266,299 B1 | * | 7/2001 | Oshima et al. .......... 369/13.38 |
| 7,061,850 B1 | * | 6/2006 | Irie et al. .................. 369/59.24 |
| 2003/0185128 A1 | * | 10/2003 | Shoji et al. .............. 369/59.25 |
| 2003/0202436 A1 | * | 10/2003 | Tomita et al. ........... 369/44.26 |
| 2004/0047252 A1 | * | 3/2004 | Miyatake et al. ........ 369/47.12 |

FOREIGN PATENT DOCUMENTS

EP  0 673 025  9/1995

(Continued)

OTHER PUBLICATIONS

European Search Report dated Nov. 20, 2006.

(Continued)

*Primary Examiner*—Ali Neyzari
(74) *Attorney, Agent, or Firm*—Sonnenschein Nath & Rosenthal LLP

(57) ABSTRACT

A magneto-optical disk having a small-sized diameter and a large capacity and able to record and reproduce disk discrimination information, and a recording method and a reproducing method of the same, wherein a recording layer including a main recording region in which a first information is recorded, a sub recording region in which a second information including the disk discrimination information is recorded, and a buffer region formed between the main recording region and the sub recording region and in which a third information is recorded is provided on a substrate, the second information is recorded by a mark array formed in stripe shapes in the sub recording region and the buffer region, a plurality of marks constituting the mark array are obtained by changing the magnetization state of the recording layer, and the third information is reproduced by a modulation signal of a reflection ratio along a circumferential direction of the disk.

50 Claims, 8 Drawing Sheets

1···MAGNETO-OPTICAL DISK
2···MAIN RECORDING REGION
3···SUB RECORDING REGION
4···BUFFER REGION
5···BCA REGION
6···NON-RECORDING REGION

FOREIGN PATENT DOCUMENTS

| | | |
|---|---|---|
| EP | 0 800 169 | 10/1997 |
| EP | 0971345 | 1/2000 |
| EP | 1357546 | 10/2003 |
| JP | 06-202820 | 7/1994 |
| JP | 11-162031 | 6/1999 |
| JP | 2001-163883 | 6/2000 |
| JP | 3224380 | 8/2001 |
| WO | WO02/39434 | 5/2002 |

OTHER PUBLICATIONS

Japanese Office Action Issued on Jun. 12, 2006.

* cited by examiner

1···MAGNETO-OPTICAL DISK
2···MAIN RECORDING REGION
3···SUB RECORDING REGION
4···BUFFER REGION
5···BCA REGION
6···NON-RECORDING REGION

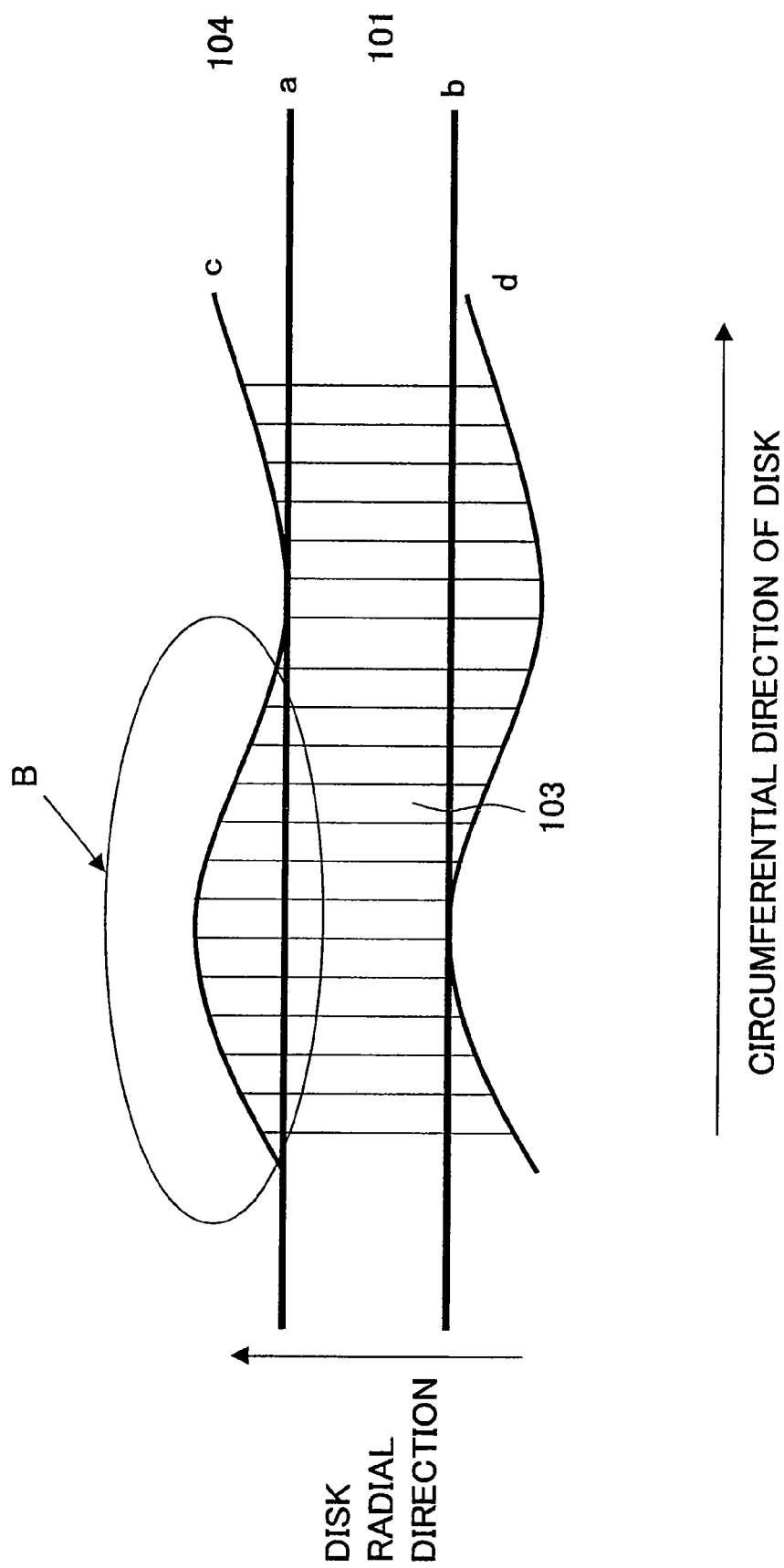

MAGNETO-OPTICAL DISK AND RECORDING AND/OR REPRODUCING METHOD AND RECORDING AND/OR REPRODUCING APPARATUS USING THE MAGNETO-OPTICAL DISK

RELATED APPLICATION DATA

The present application claims priority to Japanese Application(s) No(s). P2003-117026filed Apr. 22, 2003, which application(s) is/are incorporated herein by reference to the extent permitted by law.

BACKGROUND OF THE INVENTION

1. Field of the Invention

The present invention relates to a magneto-optical disk, a recording method for recording information on a magneto-optical disk, and an information reproducing method for reproducing information from a magneto-optical disk.

The recording method and the reproducing method will be referred to overall as a recording and/or reproduction method.

2. Description of the Related Art

In recent years, along with the increase in volume of information, the recording capacity of optical disks has risen and great advancements have been made in digital information processing technology. In digital versatile disks (DVDs), MPEG2 compression technique has been employed—making it possible to record two to four hours of video on one disk. There is no deterioration in quality due to copying of the data in the digital video, therefore when illegal copies are made, high quality copies are illegally produced and the copyright of the video is seriously infringed.

For this reason, in DVDs, a different media ID (disk discrimination information) is recorded for every disk. Namely, the copyright is protected by managing the disk discrimination information in the recording and reproducing apparatus used to restrict illegal copying and restrict reproduction of illegally copied data.

The above-mentioned method of recording the disk discrimination information is disclosed in Japanese Unexamined Patent Publication (Kokai) No. 11-162031, Japanese Unexamined Patent Publication (Kokai) No. 2000-222783, Japanese Patent No. 3224380, Japanese Patent No. 2771462, etc.

In the method disclosed in Japanese Unexamined Patent Publication (Kokai) No. 11-162031, Japanese Unexamined Patent Publication (Kokai) No. 2000-222783, and Japanese Patent No. 3224380, the disk discrimination information is recorded by forming a stripe-like mark array referred to as a "burst cutting area (BCA)" or a post cutting area (PCA)" at an inner circumference side of the disk.

Japanese Unexamined Patent Publication (Kokai) No. 11-162031 discloses to provide a first recording region and a second recording region on a magnetic film of an optical disk, form a plurality of marks having a magnetic anisotropy smaller than the magnetic anisotropy of the first recording region in a vertical direction to a film surface in the second recording region, and thereby record additional information. In the DVD, the length of the stripe-shaped marks of the BCA is set to 1.3 mm in a disk radial direction. The magnetic film of the mark portion (BCA portion) changes in magnetization state due to the deterioration of the anisotropy of the magnetic film by exposure to a laser beam or reaching the Curie temperature or more.

When reproducing a signal from the BCA formed in this way, a laser beam is focused on the area, the reflected light is divided into two polarization components perpendicular to each other, and an electrical signal corresponding to the magnetization state is extracted from the difference of the intensities (differential detection). The change of the polarization plane of the laser beam striking the magnetic film at the mark portion (Kerr rotation angle) becomes smaller than the Kerr rotation angle of the laser beam striking the magnetic film at a portion other than the mark. Accordingly, additional information is reproduced by the differential detection.

Japanese Unexamined Patent Publication (Kokai) No. 2000-222783 discloses an optical disk having a first recording region, a second recording region, and a guard band region. In the first recording region, the data is recorded by a pattern of pits. In the second region, the disk discrimination information is recorded as a barcode-like mark (PCA). The guard band region is provided between the first recording region and the second recording region. At least the address is recorded in the guard band region.

The PCA of Japanese Unexamined Patent Publication (Kokai) No. 2000-222783 is formed focusing a laser beam on a reflection film of the optical disk constituted by an aluminum layer for laser trimming to thereby form non-reflection portions or a low reflection portions. In the optical disk of Japanese Unexamined Patent Publication (Kokai) No. 2000-222783, both of the data recorded in the first recording region and the disk discrimination information recorded in the second recording region are reproduced by detecting the change of the reflection ratio.

The guard band region of the optical disk of Japanese Unexamined Patent Publication (Kokai) No. 2000-222783 is preferably provided with a width of at least 300 µm. This is set as a width larger than a single jump of the optical head as shown in Japanese Unexamined Patent Publication (Kokai) No. 2000-222783. Further, as shown in Japanese Unexamined Patent Publication (Kokai) No. 2000-222783, control data indicating physical attributes of the optical disk is preferably recorded in the first recording region. When the optical head skips over the control data region from the disk outer circumference side to access the PCA region, however, control of the optical head becomes impossible. In order to prevent this, the optical disk of Japanese Unexamined Patent Publication (Kokai) No. 2000-222783 is provided with the guard band region.

Japanese Patent No. 3224380 discloses a method of recording media discrimination information on optical recording media having a main recording region and a sub recording region. According to this method, a light beam is made to scan a read-in area of the sub recording region to record the media discrimination information. The read-in area is preferably provided in a range of a radius 22.3 mm to 23.5 mm of an optical disk having a diameter of about 120 mm. The BCA of this optical disk is left in an amorphous state in stripe shapes or is left in a crystalline state in stripe shapes. The media discrimation information is recorded by changing the reflection ratio.

As described above, in Japanese Unexamined Patent Publication (Kokai) No. 11-162031, Japanese Unexamined Patent Publication (Kokai) No. 2000-222783, and Japanese Patent No. 3224380, the BCA (or PCA) is formed at the disk inner circumference side.

On the other hand, Japanese Patent No. 2771462 discloses a method of recording the disk discrimination information by applying a magnetic field and focusing a laser beam having a higher power than the case of forming a rewritable mark to form marks with magnetization directions irreversibly changed. In Japanese Patent No. 2771462, the position for recording the disk discrimination information is not limited to the disk inner circumference.

If a higher storage density optical disk can be realized, it will become possible to use a disk having a small-sized diameter for a portable mobile electronic device so as to record a moving picture. For portable mobile electronic device applications, a DVD-RAM disk having a diameter of 80 mm is proposed. In reducing the size of moving picture cameras etc., disks having further smaller diameters are desired.

As an existing small-sized disk, the MiniDisc (MD) having a diameter of 64 mm can be mentioned. The MiniDisc is a magneto-optical disk magnetically recorded with information in a main recording region and reproduced by differential detection. A magneto-optical disk such as a MiniDisc has the advantage that the number of possible rewrites is much larger in comparison with a phase-change type disk like a DVD and also the advantage that an increase of the recording capacity is possible by employing a magnetically induced super resolution (MSR) reproduction system.

Since the MiniDisc has a small-sized diameter, it is suitable for portable mobile electronic device applications. From mainly the viewpoint of the convenience of the user, the next generation of large recording capacity disk recording and reproducing apparatuses will desirably also be able to record and reproduce existing disks. Accordingly, a magneto-optical disk having compatibility with the MiniDisc is a leading candidate as the next generation small-sized disk able to record and reproduce moving pictures.

The existing MiniDisc cannot record and reproduce disk discrimination information, so illegal copying cannot be prevented. Accordingly, in next generation small-sized disks, it is desirable to be able to prohibit illegal copying on the disk side by utilizing disk discrimination information. However, recording and reproducing disk discrimination information by forming a BCA at the inner circumference of a disk by the above conventional method or controlling recording and/or reproduction for preventing illegal copying based on the disk discrimination information would be difficult for a small-sized disk having a diameter of for example about 64 mm.

When recording disk discrimination information by the conventional method, the recording and reproducing characteristics of the user data in the main recording region (first recording region) and the recording and reproducing characteristics of the disk discrimination information in the sub recording region (second recording region) are degraded for the reasons mentioned later when the disk is reduced in size.

If reducing the area of the main recording region, such degradation of the recording and reproducing characteristics can be prevented, but in a disk having the small-sized diameter, it is particularly important to secure a sufficient recording capacity in the limited recording region. If trying to improve the recording and reproducing characteristics in the main recording region and the sub recording region, it no longer becomes possible to achieve the recording capacity required for the recording and reproduction of a moving picture.

As one of the factors degrading the recording and reproducing characteristics of the main recording region, there can be mentioned the fact that the BCA is actually formed meandering on a rough circle.

FIG. 7 is a schematic view of a BCA. The ring-like region between a broken line a and a broken line b is a sub recording region 101. The BCA is the mark array comprised of a plurality of marks 102 long in the disk radial direction arranged in stripe shapes (barcode shape) along the circumferential direction of the disk. A length L of the BCA in the circumferential direction of the disk is not limited to that of the example of FIG. 7 and can be changed in accordance with the disk discrimination information to be recorded.

FIG. 8 is a schematic view enlarging part of FIG. 7 and shows the circumferential direction of the disk (disk rotation direction) on a straight line perpendicular to the disk radial direction. The upper side of FIG. 8 corresponds to the disk outer circumference side of FIG. 7. In FIG. 8, the band-like region between the straight line a and the straight line b is the sub recording region 101. Further, the mark array of the BCA is formed in the band-like region between a curve c and a curve d (hereinafter referred to as a "BCA region 103"). Namely, a plurality of marks 102 of FIG. 7 are formed in the BCA region 103.

According to Japanese Unexamined Patent Publication (Kokai) No. 11-162031 and Japanese Patent No. 3224380, as shown in FIG. 8, a main recording region 104 is formed on the disk outer circumference side of the sub recording region 101 so as to be adjacent to the sub recording region 101. Note that, in the technology disclosed in Japanese Unexamined Patent Publication (Kokai) No. 2000-222783, the guard band region is formed on the disk outer circumference side of the sub recording region 101 so as to be adjacent to the sub recording region 101.

As shown in FIG. 7, the mark array of the BCA is formed roughly on a circle, but when finely viewing this, it meanders as shown in FIG. 8. As the factor of such meandering, eccentricity of the disk itself can be mentioned. Also, the precision of the disk fixing jig used at the time of forming the marks of the BCA exerts an influence upon the meandering (wobbling).

As disclosed in Japanese Patent No. 3224380, the marks of the BCA are formed by rotating the disk and focusing a pulse-like laser beam on the disk. If focusing the laser beam on the disk in a state where only a focus servo is applied, the focus can be made to track surface wobbling of the disk accompanying rotation of the disk, but the offset of the beam position in the disk radial direction cannot be solved. Accordingly, in actuality, the mark array is not correctly formed on a circle and meanders.

In general, in the BCA, the length in the disk radial direction (distance between the curve c and the curve d) is set to be more than the width of the sub recording region 101 (distance between the straight line a and the straight line b) so that the recording and reproducing characteristics of the disk discrimination information are guaranteed on the sub recording region 101. When the amplitude of the meandering of the mark array is large there is a part at which the sub recording region 101 and the BCA region 103 do not overlap (a circled portion A in FIG. 8), that is, a part in which the disk discrimination information is not recorded in the sub recording region 101, the recording and reproducing characteristics of the disk discrimination information cannot be secured.

In order to prevent this, as shown in FIG. 9, the superimposed margin of the BCA region 103 in the disk radial direction may be made larger. In this case, however, the disk discrimination information interferes with the main recording region 104 adjacent to the sub recording region 101 (refer to the circled portion B of FIG. 9).

In the case of a magneto-optical disk like a MiniDisc in which the information recorded in the main recording region is reproduced by differential detection, when the BCA disclosed in Japanese Unexamined Patent Publication (Kokai) No. 11-162031 is formed, both of the recording information of the main recording region and the disk discrimination information will be reproduced by the differential detection. Accordingly, the disk discrimination information signal is overlappingly recorded in the main recording region 104. At the portion B in which these signals interfere, the recording and reproduction of the main recording region cannot be carried out, so the recording capacity of the magneto-optical disk is lowered.

If providing a space between the sub recording region 101 and the main recording region 104 in order to avoid interference of the disk discrimination information with the main recording region 104, the area of the main recording region 104 is reduced. This is disadvantageous for increasing the recording capacity. Slight meandering of the mark array of the BCA and securing the region for avoiding the influence thereof do not become problems in a disk having a relatively large-sized diameter with an extra margin of space. In a small-sized diameter disk, however, the reduction of the recording capacity due to the provision of the space unable to be recorded with information becomes a serious problem.

It can also be considered to make the length of the BCA region 103 in the disk radial direction shorter to secure the recording capacity of the main recording region 104. However, disk discrimination information is usually reproduced in a tracking servo OFF state (tracking off), so if the length of the BCA region 103 in the disk radial direction is shortened, the positioning precision between the magneto-optical disk and the disk recording and reproducing apparatus will become insufficient and it will no longer be possible to correctly reproduce the disk discrimination information. Accordingly, there is a limit to securing the recording capacity by making the length of the BCA in the disk radial direction shorter.

Therefore, it can be considered to record the disk discrimination information while being overlapped on at least one part of the other information, and secure the recording capacity of the main recording region. Japanese Unexamined Patent Publication (Kokai) No. 2000-222783 shows that signal reproduction of the PCA recorded overlapped with pits of the read-in data region is possible. However, the PCA signal is a modulation signal of the reflection ratio, so when the signal based on the pits and the PCA signal become the same in pulse width under certain conditions, the two cannot be discriminated.

Further, Japanese Patent No. 3224380 discloses to record position information etc. concerning the main information in the sub recording region by the pits and record the BCA overlapped at part of the pits. However, the BCA of Japanese Patent No. 3224380 is a portion changed in the reflection ratio, so reproduction of a signal recorded by the pits of the portion where the BCA overlaps is difficult in the same way as the case of the optical disk disclosed in Japanese Unexamined Patent Publication (Kokai) No. 2000-222783.

As described above, according to the conventional known methods, it is difficult to reproduce other information recorded overlapped with disk discrimination information.

On the other hand, the method of reproducing the disk discrimination information in the tracking servo ON state (tracking on) and making the optical head track meandering of the BCA can be considered. In this case, the overlapping margin of the BCA region 103 with the main recording region 104 can be reduced, so there is a possibility that the disk can be enlarged in recording capacity. However, as disclosed in Japanese Unexamined Patent Publication (Kokai) No. 11-162031 and Japanese Unexamined Patent Publication (Kokai) No. 2000-222783, usually the BCA is formed at the mirror part without grooves at the inner circumference of the disk. In this case, the disk discrimination information cannot be reproduced in the tracking ON state.

In addition to the above problems, in a magneto-optical disk having a high recording density, when trying to reproduce information recorded in the main recording region and the disk discrimination information recorded in the sub recording region by differential detection under the same conditions, there is the problem that a good reproduction signal of the disk discrimination information cannot be obtained.

If employing the MSR reproduction system in a magneto-optical disk, it becomes possible to greatly raise the recording density of the disk and thereby increase the recording capacity of the disk. The MSR reproduction system forms the recording layer by multiple magnetic layers and utilizes the temperature dependency of interchange magnetic coupling or static magnetic coupling between magnetic layers to makes the effective beam diameter smaller.

According to the MSR reproduction system, marks of less than the optically focused beam diameter can be reproduced, so a high resolution is obtained. Up until now, several types of MSR reproduction systems have been proposed (refer to for example Japanese Unexamined Patent Publication (Kokai) No. 6-290496). Magneto-optical disks employing the MSR reproduction system have already been marketed.

MSR is a phenomenon occurring due to the interchange magnetic coupling or the static magnetic coupling between the magnetic layers being cut above a certain temperature. Accordingly, when focusing a laser beam with a power resulting in the magnetic layers constituting the recording layer reaching more than a predetermined temperature, marks having a diameter less than the beam diameter can be reproduced. Such fine marks are used for recording information in for example the main recording region.

On the other hand, the BCA for recording the disk discrimination information is much larger in comparison with the fine marks reproduced by the MSR reproduction system, so it can be sufficiently detected by differential detection not utilizing the MSR reproduction system. The disk discrimination information recorded by the stripe-shaped mark array is reproduced by providing two slice levels in the amplitude level of the reproduction signal and comparing the signals.

When there is little noise component in the reproduction signal, the difference between the two slice levels, that is, the reproduction amplitude margin, is sufficiently large, so good reproducing characteristics are obtained. However, when the mark array of the disk discrimination information is reproduced under conditions where the effect of the MSR appears, the noise of the reproduction signal becomes large and the reproduction amplitude margin is reduced.

SUMMARY OF THE INVENTION

An object of the present invention is to provide a magneto-optical disk having a small-sized diameter and a large recording capacity and able to record and reproduce disk discrimination information.

Another object of the present invention is to provide a recording method and a reproducing method of a magneto-optical disk able to record and reproduce a large amount of information by a disk having a small-sized diameter and able to record and reproduce disk discrimination information.

Still another object of the present invention is to provide a recording apparatus and a reproducing apparatus of a magneto-optical disk able to record and reproduce a large amount of information by a disk having a small-sized diameter and able to record and reproduce disk discrimination information.

According to a first aspect of the present invention, there is provided a magneto-optical disk having a recording layer made of a magnetic film having magnetic anisotropy in a vertical direction to a film surface of a substrate on the substrate, wherein the recording layer comprises a main recording region for recording first information, a sub recording region formed on an inner circumference side from the main recording region and recording second information including disk discrimination information, and a buffer region formed between the main recording region and the sub recording region and recording third information, wherein the second information is recorded in a form of a mark array formed in stripe shapes in the sub recording region and the buffer region, a plurality of marks constituting the mark array being parts changed in magnetization state of the recording layer, and wherein the third information can be reproduced by a modulation signal of a reflection ratio along a circumferential direction of the magneto-optical disk.

The mark array is formed meandering along the circumferential direction of the disk. The size of the buffer region in the disk radial direction has at least the amplitude of the meandering. Preferably, the third information includes control data indicating physical attributes of the magneto-optical disk and recorded by pits or wobbling grooves. Preferably, the recording layer is made of at least three magnetic layers having different Curie temperatures.

Due to this, it is possible to effectively utilize the space in which the mark array recording the second information meanders to record and reproduce third information. Further, reproduction error of the second information due to meandering of the mark array is prevented. According to the magneto-optical disk of the present invention, a disk having a small-sized diameter can be increased in recording capacity.

According to a second aspect of the present invention, there is provided a method and an apparatus for recording information in the magneto-optical disk.

In the recording method of the magneto-optical disk and the recording apparatus of the magneto-optical disk of the present invention, provision is made of a step of (means for) forming a track having a reflection ratio changing along a circumferential direction of the disk in a buffer region provided on an inner circumference side of the main recording region and recording the third information and a step of (means for) forming a stripe-shaped mark array in a sub recording region provided on the inner circumference side of the buffer region and recording the second information, wherein the step of (means for) recording the second information includes a step of (means for) rotating the magneto-optical disk and focusing pulse light on the magneto-optical disk in a tracking servo OFF state and a step of (means for) forming part of the meandering mark array in the buffer region and recording the second information in the buffer region overlapped with the third information.

Due to this, it becomes possible to record first information with a large recording capacity in a disk having a small-sized diameter. Further, it becomes possible to record disk discrimination information which can be used for the purpose of copyright protection in a disk having a small-sized diameter.

It is also possible to form the mark array by irreversibly eliminating or degrading magnetism in part of the recording layer or form it by inverting the magnetization in part of the recording layer initialized by uniform magnetization to magnetize it. While the second information is recorded in the tracking OFF state, in the main recording region, the tracking servo is applied for high density recording. Preferably, the third information is recorded by forming pits or wobbling grooves.

According to a third aspect of the present invention, there is provided a method and apparatus for reproducing information on the magneto-optical disk.

In the recording method and apparatus of the magneto-optical disk of the present invention, provision is made of a step of (means for) reproducing first information recorded in the main recording region of the magneto-optical disk by focusing light having an intensity resulting in a temperature Tr of the recording layer becoming larger than Tc2 and a step of (means for) reproducing second information including disk discrimination information recorded in the sub recording region by focusing light having an intensity resulting in the temperature Tr of the recording layer becoming smaller than Tc2, and the first information is reproduced by control based on the reproduced second information.

Due to this, it becomes possible to reproduce first information recorded in the main recording region and second information recorded in the sub recording region and the buffer region under preferred conditions. Specifically, the first information is reproduced by utilizing the MSR reproduction system. On the other hand, the second information is reproduced with a low noise by differential detection not utilizing the MSR reproduction system. Accordingly, good reproducing characteristics are obtained. The reproduction of the first information is controlled and managed by the second information, so infringement of the copyright for the first information is prevented. Further, since the MSSR reproduction system is utilized for the reproduction of the first information, the recording density of the main recording region can be raised and the magneto-optical disk can be increased in recording capacity.

According to a fourth aspect of the present invention, there is provided a method and apparatus for reproducing information from a magneto-optical disk recording third information including physical attributes of the magneto-optical disk comprising a step of (means for) reproducing the second information recorded by a stripe-shaped mark array formed at part of the buffer region provided on the inner circumference side of the main recording region and a sub recording region provided on the inner circumference side of the buffer region in a tracking servo OFF state and a step of (means for) reproducing the third information recorded in the buffer region by a modulation signal of a reflection ratio along a circumferential direction of the disk.

In the reproducing method and apparatus of the magneto-optical disk of the present invention, preferably provision is further made of a step of (means for) control according to the reproduced second information to record or reproduce the first information in the main recording region. Due to this, even in a disk having a small-sized diameter, it becomes possible to perform high density recording and record disk discrimination information. Accordingly, infringement of the copyright for the first information due to illegal action is prevented.

Preferably, the step of (means for) reproducing the third information includes a step of (means for) reproducing the third information recorded in the sub recording region overlapped on the second information. Further, the step of (means for) recording or reproducing the first information is carried out in a tracking servo ON state. Due to this, the main recording region can be secured, and the magneto-optical disk can be increased in recording capacity.

BRIEF DESCRIPTION OF THE DRAWINGS

These and other objects and features of the present invention will become clearer from the following description of the preferred embodiments given with reference to the accompanying drawings, in which:

FIG. 9 is a view of a problem occurring in a mark array for recording disk discrimination information.

DESCRIPTION OF THE PREFERRED EMBODIMENTS

Below, preferred embodiments of the magneto-optical disk of the present invention and the method of recording and reproducing using it will be described with reference to the accompanying drawings.

The magneto-optical disk of the present embodiment is a disk having a small-sized diameter suitable for portable mobile electronic device applications. It has a transparent substrate having a diameter of 64 mm and a thickness of 1.2 mm in the same way as a MiniDisc (MD).

In the magneto-optical disk of the present embodiment, the magnetically induced super resolution (MSR) reproduction system enabling large capacity recording is employed. According to the magneto-optical disk of the present embodiment, recording and reproduction of a moving picture also become possible. The magneto-optical disk of the present embodiment can be used in a recording and reproducing apparatus having an optical system having a wavelength of 780 nm and a numerical aperture (NA) of 0.45. Compatibility with the conventional MiniDisc (compatibility with lower devices) can be imparted to the recording and reproducing apparatus of a magneto-optical disk of the present embodiment.

Figure 1:
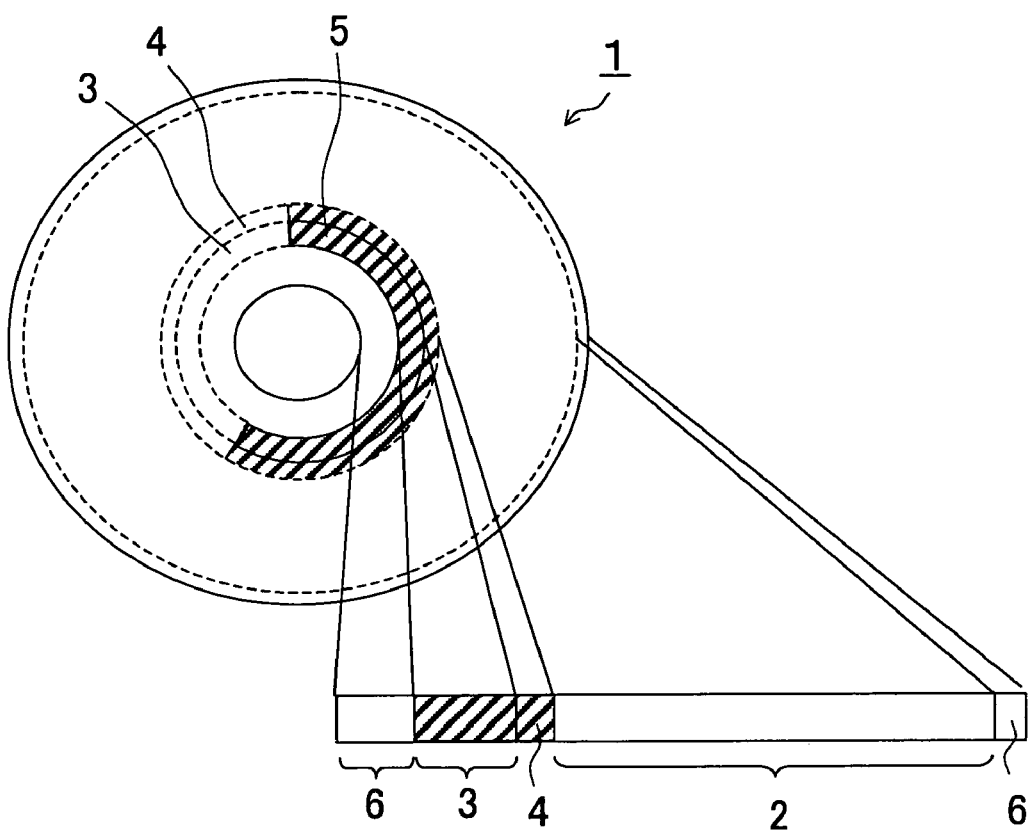
FIG. 1 is a schematic view of a recording region of a magneto-optical disk of an embodiment of the present invention.

FIG. 1 is a schematic view of a recording region of a magneto-optical disk of the present embodiment. A magneto-optical disk 1 of the present embodiment has a main recording region 2, a sub recording region 3 formed on the inner circumference side of the main recording region 2, and a buffer region 4 provided between the main recording region 2 and the sub recording region 3. The main recording region 2, the sub recording region 3, and the buffer region 4 are formed in ring shapes.

Below, an explanation will be given of these regions. In the main recording region 2, the first information constituted by the user data is recorded and reproduced. The user data is information which can be recorded, reproduced, or erased by the user using the recording and reproducing apparatus of the magneto-optical disk 1. The information recorded in the main recording region is reproduced by the differential detection method.

A wobbling groove is formed in the track of the main recording region 2. The address information is recorded by the wobbling. The wobbling groove is a groove wobbling (meandering) with a predetermined frequency (for example 22.05 kHz) and a predetermined amplitude (for example 30 nm) by modulation by the address information.

Figure 5:
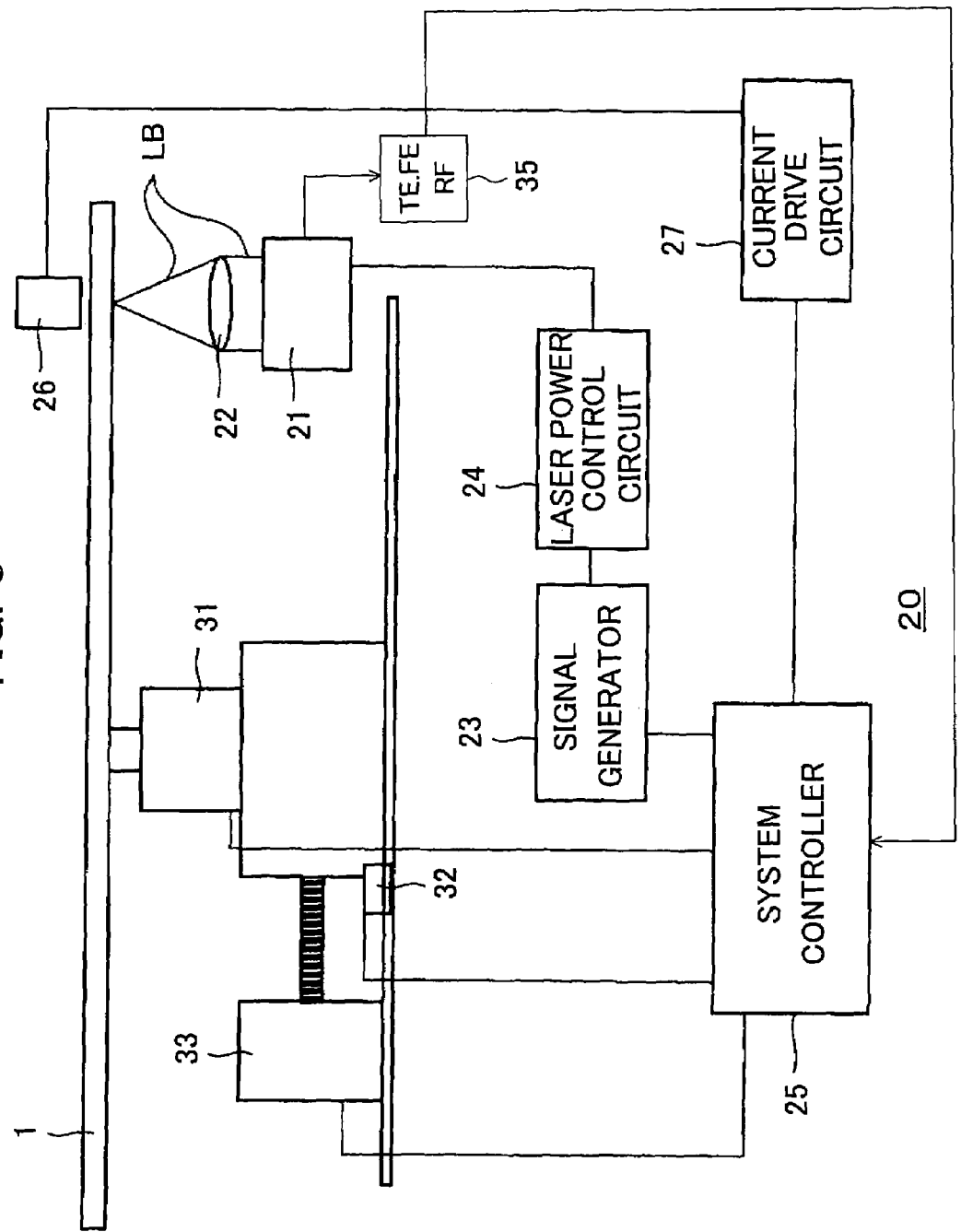
FIG. 5 is a schematic view of an apparatus for recording and/or reproducing disk discrimination information of a magneto-optical disk according to an embodiment of the present invention.

When reproducing the first information recorded in the track of the main recording region 2, a beam focused on the main recording region 2 from a laser (not illustrated) mounted on for example a pickup 21 of FIG. 5 is diffracted by the wobbling groove. This diffraction light is detected by a split photodiode arranged in for example the pickup 21 of FIG. 5 so as to be located symmetric with respect to the track center.

As the split photodiode, use is made of for example a four-element split photodiode. When for example a tracking error (TE) focus error (FE) sum (RF) signal producing circuit 37 illustrated in FIG. 5 find the difference between a sum of detection signals of the two elements sandwiching the track and the sum of the detection signals of the other two elements, it can find a tracking error signal indicating the offset from the track. Namely, when the beam is offset from the track center, a difference in intensity occurs in the light detected on the two sides of the track center and a tracking error signal is detected.

A magneto-optical disk usually has an eccentricity of about ±tens of μm with respect to the axial center of rotation, therefore the tracking error signal becomes a sine wave signal. Utilizing the tracking error signal detected at the TE FE RF signal producing circuit 37, tracking servo is applied in a radial direction (track direction) of the magneto-optical disk 1 by a coaxial actuator (not illustrated) mounted on the pickup 21 under the control of the system controller 25 illustrated in FIG. 5. Due to this, the beam can be made to follow the track and reproduce the user data of the main recording region 2.

When applying tracking servo, a small sine wave shaped wobble signal appears on the tracking error signal. This wobble signal is also referred to as an address-in-pregroove (ADIP) signal. By decoding the ADIP signal in for example the system controller 25 of FIG. 5, the address information can be read. The frequency of wobble of the wobbling groove is sufficiently high in comparison with the band of the tracking servo, therefore the tracking servo does not track the wobble of the wobbling groove.

In the sub recording region 3, the second information of the present invention constituted by the disk discrimination information is recorded and reproduced. The disk discrimination information is recorded as a stripe-shaped mark array in the sub recording region 3. Note that the second information includes at least the disk discrimination information. Other information can be recorded in the stripe-shaped mark array too, but in the following explanation, the disk discrimination information will be defined as the second information.

FIG. 1 shows the region for forming the mark array for recording the disk discrimination information (BCA (Burst Cutting Area) region 5) by hatching. The length of this mark array in the circumferential direction of the magneto-optical disk 1 is not particularly limited.

The disk discrimination information is unique information for every magneto-optical disk 1. Its signal is reproduced by using the recording and reproducing apparatus (magneto-optical disk discrimination information recording apparatus 20) of the magneto-optical disk 1 illustrated in FIG. 5. In principle, the user cannot record or copy the signal. The disk discrimination information can be used for protecting the copyright of the image, video, audio, computer program, etc. recorded on the disk.

Even when video or other data is recorded in the main recording region 2 by illegal copying, it can be discriminated as being an illegal copy for example by the magneto-optical disk discrimination information recording apparatus 20 illustrated in FIG. 5 reproducing the disk discrimination information. By control using the disk discrimination information, reproduction of illegally copied data can also be prevented. The recording and reproduction of user data can be controlled or managed using the disk discrimination information according to a conventionally known method (refer to for example Japanese Unexamined Patent Publication (Kokai) No. 11-162031).

In the buffer region 4, control data indicating at least the physical attributes of the magneto-optical disk 1 is recorded as third information. The disk discrimination information is mainly recorded in the sub recording region 3, but part is also recorded in the buffer region 4. Accordingly, in at least part of the buffer region 4, the second information and the third information are recorded overlapped. The disk discrimination information and the physical attribute recorded in the buffer region 4 can be independently reproduced. The physical attributes of the disk can also be recorded in the sub recording region 3 at a portion not overlapping the BCA region 5 of FIG. 1.

The third information including the physical attributes of the disk is recorded and reproduced by using the change of the reflection ratio along the circumferential direction of the disk. Specifically, the pits or the wobbling groove are formed in the buffer region 4. For example, the magneto-optical disk discrimination information recording apparatus 20 illustrated in FIG. 5 records and reproduces the third information utilizing the modulation signals of the reflection ratios.

The disk discrimination information recorded in the buffer region 4 is reproduced by the differential detection method, so even if the disk discrimination information and the physical attributes are recorded overlapped, these signals do not interfere with each other. Further, since part of the disk discrimination information and the physical attributes can be recorded overlapped, the area of the main recording region 2 can be secured and the magneto-optical disk 1 can be increased in recording capacity. In FIG. 1, non-recording regions 6 are formed at the inner circumference side of the sub recording region 3 and the outer circumference side of the main recording region 2.

Figure 2:
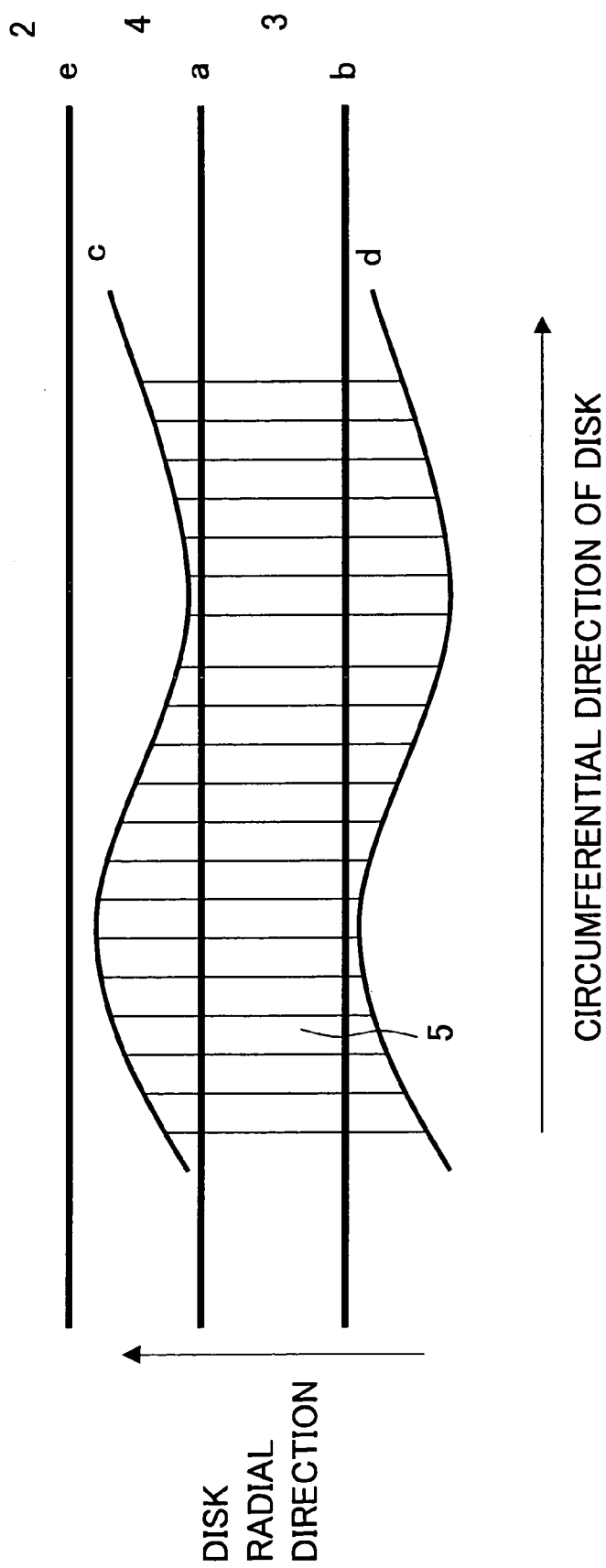
FIG. 2 is a schematic view enlarging a mark array for recording disk discrimination information of the magneto-optical disk of the embodiment of the present invention.

FIG. 2 is a schematic view enlarging part of FIG. 1 and shows the circumferential direction of the magneto-optical disk 1 (disk rotation direction) on a straight line perpendicular to the disk radial direction. The upper side of FIG. 2 corresponds to the outer circumference side of the disk of FIG. 1. In FIG. 2, the band-like region between the straight line a and the straight line b is the sub recording region 3. Further, the mark array of the BCA is formed in the BCA region 5 between the curve c and the curve d. In the BCA region 5, a plurality of marks are formed in stripe shapes. The portion above than the straight line e is the main recording region 2.

The mark array of the BCA is formed by for example rotating the magneto-optical disk 1 by a spindle motor 31 illustrated in FIG. 5 and focusing a pulse-like laser beam on the disk from a laser mounted on the pickup 21 in the tracking servo ON state in the system controller 25. Accordingly, the focus servo can be made to track surface wobbling of the magneto-optical disk 1 with respect to the reference horizontal surface accompanying rotation of the magneto-optical disk 1, by the focus control of the system controller 25. Since tracking servo is not applied, however, the beam position is offset in the radial (track) direction of the magneto-optical disk 1. In actuality, the mark array of the BCA is formed by wobbling (meandering) due to the eccentricity of the magneto-optical disk 1 itself and the fixing precision of the fixing jig of the magneto-optical disk 1.

The size of the buffer region 4 in the radial direction of the magneto-optical disk 1 is made larger than at least the amplitude of such meandering (wobbling). According to the magneto-optical disk 1 of the first embodiment, as shown in FIG. 2, even if the mark array of the BCA region 5 meanders, no non-recording portion of the disk discrimination information will be formed at the sub recording region 3. Accordingly, the reproduction of the disk discrimination information is guaranteed at the sub recording region 3.

In the magneto-optical disk 1 of the first embodiment, for example, the main recording region 2 is formed at a portion having a radius of 16.0 mm or more. The buffer region 4 has a size of 0.3 mm or more in the radial direction of the magneto-optical disk 1 and is formed in a range of radius of for example 15.7 to 16.0 mm. The sub recording region 3 is formed in a range of for example a radius of 14.5 to 15.7 mm.

In a DVD, the position of the BCA is standardized to a radius of 22.3 to 23.5 mm, but on the magneto-optical disk 1 of the present embodiment, this position is utilized as the main recording region 2, and the disk discrimination information is recorded on the inner circumference side.

Figure 3:
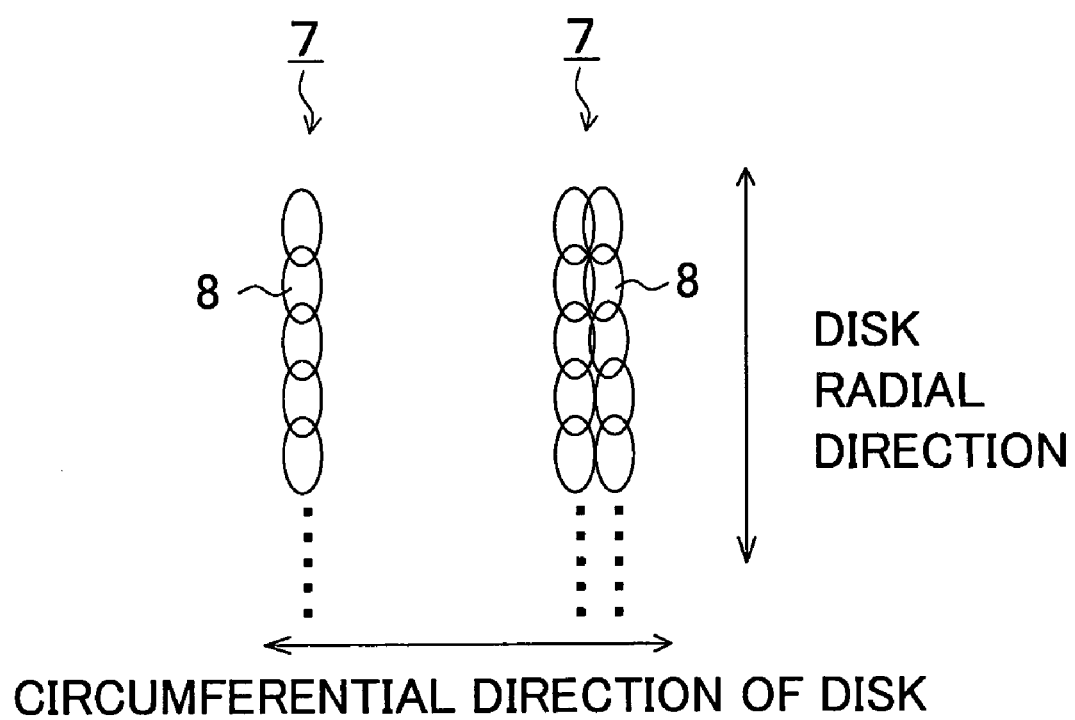
FIG. 3 is an enlarged view of the mark array for recording disk discrimination information of the magneto-optical disk of the embodiment of the present invention.

FIG. 3 is an enlarged view of the stripe-shaped mark array of the BCA. As shown in FIG. 3, when viewed closely, each mark 7 is formed of a plurality of mark elements 8 having shapes substantially determined by for example the beam spot of the laser mounted on the pickup 21 of FIG. 5 and linked in at least the radial direction of the magneto-optical disk 1. Depending on the width of a mark 7 in the circumferential direction of the magneto-optical disk 1, the mark 7 is also formed by a plurality of mark elements 8 arranged in the circumferential direction of the magneto-optical disk 1.

When forming the mark array of the BCA, for example, the magneto-optical disk 1 attached to the spindle motor 31 illustrated in FIG. 5 is rotated by the spindle motor 31 and a laser beam is focused from the pickup 21 to one point on the magneto-optical disk 1. At this time, the pulse-like beam modulated by a modulation signal based on the disk discrimination information is focused on the magneto-optical disk 1. Due to this, a plurality of mark elements are formed side by side in a row along the circumferential direction of the magneto-optical disk 1. This will be referred to as a row of the mark element array.

While the magneto-optical disk 1 is being rotated one turn by the spindle motor 31, the magneto-optical disk 1 and the pickup 21 are relatively moved in the radial direction (track) direction of the magneto-optical disk 1. When further rotating the magneto-optical disk 1, the pulse-like beam is focused at positions of the magneto-optical disk 1 different in radial (track) position. Due to this, a new mark element array is formed substantially concentrically with the already formed row of the mark element array. By forming a plurality of mark elements while moving the focused position of the beam spirally with respect to the center of rotation of the magneto-optical disk 1 in this way, a stripe-shaped mark array is formed on the magneto-optical disk 1.

Figure 4:
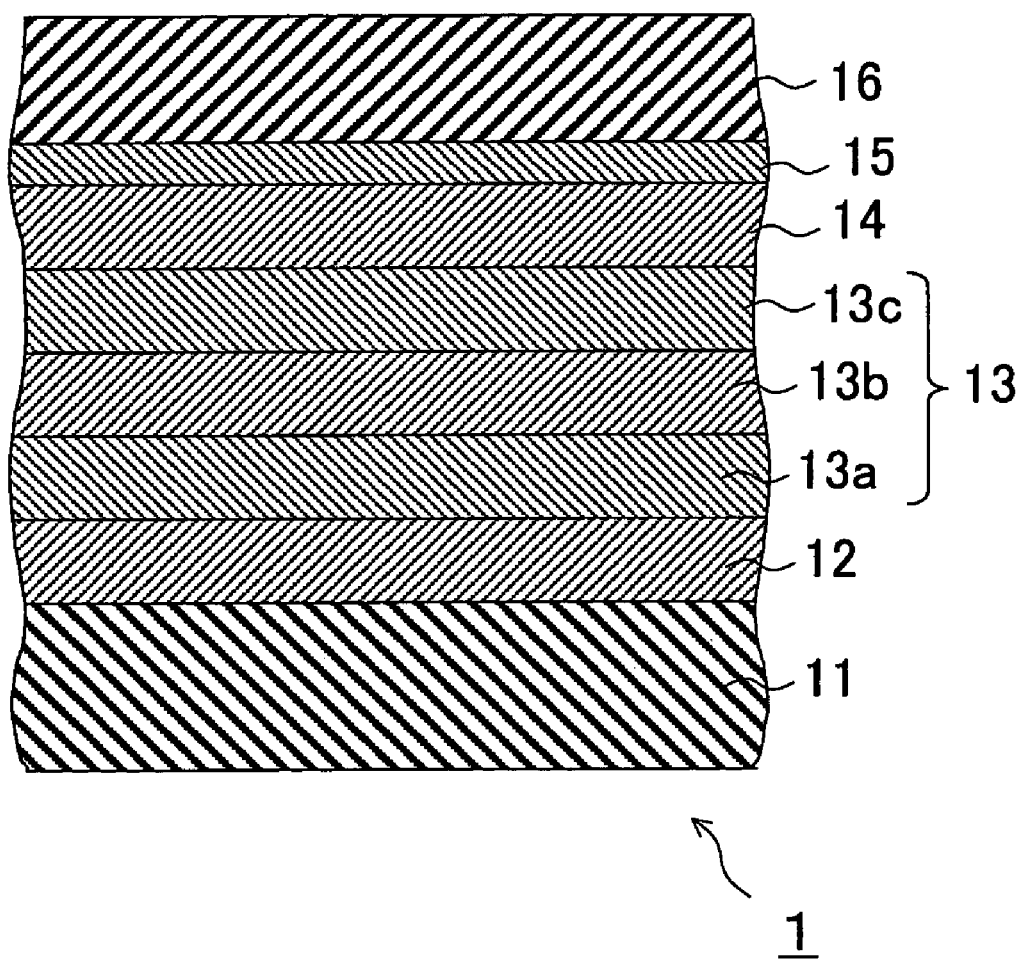
FIG. 4 is a sectional view of an example of a magneto-optical disk of the embodiment of the present invention.

FIG. 4 is a cross-sectional view of the main layers constituting the magneto-optical disk 1 of the present embodiment. As shown in FIG. 4, the disk is comprised of a substrate 11 made of polycarbonate etc. over which a first dielectric layer 12 is formed and over which in turn a magneto-optical recording layer 13. The magneto-optical recording layer 13 has successively stacked above it a second dielectric layer 14, a thermal diffusion layer 15, and a protection film 16.

When recording and reproducing user data at the main recording region of the magneto-optical disk 1 shown in FIG. 4, for example the pickup 21 illustrated in FIG. 5 is arranged at the substrate 11 side and for example the magnetic head 26 illustrated in FIG. 5 is arranged at the protection film 16 side. The laser beam from the laser mounted on the pickup 21 is focused the substrate 11 side, and the rotation angle of the polarization plane of the returned light from the magneto-optical disk 1 is detected by using the pickup 21. In the MSR reproduction system, the magneto-optical recording layer 13 is locally heated by the laser beam and further an external magnetic field is applied by the magnetic head 26 according to need so as to reproduce a recording mark smaller than the beam spot.

In a magneto-optical disk to which the MSR reproduction system is applied, the magneto-optical recording layer 13 includes at least three magneto-optical recording layers. The three magnetic layers forming the magneto-optical recording layer 13 shown in FIG. 4 will be referred to as a first magnetic layer 13a, a second magnetic layer 13b, and a third magnetic layer 13c from the substrate 11 side.

When the Curie temperature of the first magnetic layer 13a is Tc1 (° C.), the Curie temperature of the second magnetic layer 13b is Tc2 (° C.), and the Curie temperature of the third magnetic layer 13c is Tc3 (° C.), among these Curie temperatures, the Curie temperature Tc2 (° C.) of the second magnetic layer 13b is the lowest. Namely, either of the following equation (1) or (2) stands.

$$Tc1 > Tc3 > Tc2 \quad (1)$$

$$Tc3 > Tc1 > Tc2 \quad (2)$$

As an example of the MSR reproduction system, the domain wall displacement detection (DWDD) system (refer to for example Japanese Unexamined Patent Publication (Kokai) No. 6-290496) can be mentioned. In the DWDD system, a domain transferred from the third magnetic layer (recording layer) 13c via the second magnetic layer (intermediate layer) 13b to the first magnetic layer (domain wall displacement layer) 13a is displaced in the laser spot by utilizing a temperature gradient produced by the laser beam. By this, the domain is magnified and the information is reproduced.

As another MSR system, the magnetic domain expansion and reproduction system can be mentioned. According to the magnetic domain expansion and reproduction system, a mark existing in the third magnetic layer (recording layer) 13c is expanded to a size giving a sufficient S/N ratio at the first magnetic layer (expansion layer) 13a at the time of the reproduction by for example the power of the external magnetic field from the magnetic head 26. The magneto-optical disk of the present embodiment may also be one employing an MSR system such as the double-mask rear aperture (D-RAD) system in addition to the above system. The type of the MSR reproduction system is not particularly limited.

The first dielectric layer 12 shown in FIG. 4 improves the optical efficiency of the magneto-optical disk 1. Further, it suppresses diffusion of moisture from the substrate 11 to the magneto-optical recording layer 13 and thereby prevents deterioration of the quality of the magneto-optical recording layer 13. As the first dielectric layer 12, use is made of for example a silicon nitride film (SiN film).

As the first magnetic layer 13a of the magneto-optical recording layer 13, use is made of a layer of for example GdFeCo or GdFe. As the second magnetic layer 13b, use is made of a layer of for example TbFe, TbFeAl, TbFeCoAl, TbFeSi, or TbFeCoSi. As the third magnetic layer 13c, use is made of a layer of for example TbFeCo or DyFeCo.

The second dielectric layer 14 suppresses the diffusion of heat due to the light striking the magneto-optical disk 1 to improve the recording and reproducing characteristics. As the second dielectric layer 14, use is made of for example an SiN film. The thermal diffusion layer 15 reflects the laser beam and diffuses the heat generated by the laser beam. As the thermal diffusion layer 15, use is made of for example an Al alloy layer. The protection film 16 protects the magneto-optical disk from for example damage or wear due to collision or contact with the magnetic head 26. As the protection film 16, use is made of for example a layer of a UV curable resin.

For example, when recording the disk discrimination information on the above magneto-optical disk by using the magneto-optical disk discrimination information recording apparatus 20 illustrated in FIG. 5, the magneto-optical recording layer 13 is magnetized in one direction in advance. The magneto-optical disk 1 is then attached to the spindle motor 31 of the magneto-optical disk discrimination information recording apparatus 20, and the magneto-optical disk 1 is rotated. The system controller 25 applies focus servo control to control the magnetic head 26 to apply a magnetic field in an inverse direction to the magnetization direction to the magneto-optical disk 1 and focuses a laser beam modulated by the modulation signal from the signal generator 23 and controlled in power by the laser power control circuit 24. This modulation signal is made a signal corresponding to the disk discrimination information to be recorded on the magneto-optical disk 1. Due to this, the disk discrimination information is recorded as a stripe-shaped mark array formed by a plurality of marks long in the radial direction of the magneto-optical disk 1.

For example, by using the magneto-optical disk discrimination information recording apparatus 20 illustrated in FIG. 5, the length of the marks for recording the disk discrimination information in the circumferential direction of the magneto-optical disk 1 is much longer than the length of the marks for recording the information in the main recording region in the circumferential direction of the magneto-optical disk 1 or is about 3 to 9 µm. Further, the length of the marks for recording the disk discrimination information in the radial direction of the magneto-optical disk 1 is about 1.5 mm.

The usual recording systems of magneto-optical disks include magnetic field modulation systems and an optical modulation systems. The magnetic field modulation system sets the laser power so that the recording layer (third magnetic layer 13c of FIG. 14) reaches a temperature near the Curie temperature Tc3 and applies a magnetic field modulated according to the information to be recorded to record a mark.

On the other hand, the optical modulation system initializes the recording layer so that it becomes uniform in magnetization direction, then applies a magnetic field in the inverse direction to the initialization and focuses a modulated laser beam on the layer. At this time, it focuses a laser beam modulated according to the information to be recorded on the layer to record a mark.

In the magneto-optical disk 1 of the present embodiment, information is recorded on the main recording region 2 shown in FIG. 1 according to the magnetic field modulation system. In the case of the magnetic field modulation system, over writing is possible in real time. Contrary to this, since the disk discrimination information is not rewritten by the user, it is not necessary to record the information in real time.

Further, it is also not necessary to record the disk discrimination information by the recording and reproducing apparatus of the magneto-optical disk used for the recording the information in the main recording region. Therefore, the disk discrimination information is recorded by using an apparatus able to focuse on the disk a laser beam having a larger beam spot size and larger power than the recording and reproducing apparatus of the magneto-optical disk.

Below, an explanation will be given of the method of recording the disk discrimination information by the optical modulation system. FIG. 5 is a schematic view of the magneto-optical disk discrimination information recording apparatus 20.

The magneto-optical disk discrimination information recording apparatus 20 focuses a laser beam LB on the magneto-optical disk 1 from a not illustrated laser in the pickup 21. The laser beam LB is focused by the objective lens 22 to the magneto-optical disk 1. The beam spot on the magneto-optical disk 1 is shaped as an oval long in the radial direction of the magneto-optical disk 1 and extends over a plurality of tracks.

The pickup 21 is provided with not illustrated laser, beam splitter, split photodiode, and optical element. The light from the laser is made to strike the objective lens 22 via the beam splitter, focused at the objective lens 22, and focused on the magneto-optical disk 1. The returned light from the magneto-optical disk 1 is made to strike the split photodiode via the beam splitter and the optical element. Based on signals from the split photodiode, the TE FE RF signal producing circuit 37 generates the tracking error signal, the focus error signal, and the sum signal. Focus servo control is applied by the system controller 25 using the focus error signal. Namely, it controls the distance between the pickup 21 and the recording layer of the magneto-optical disk 1 for an exact focus.

The emission of the laser beam LB from the pickup 21 is controlled by controlling the power applied to the not illustrated laser by the system controller 25 via the signal generator 23 and the laser power control circuit 24. The signal generator 23 generates a signal for modulating the laser power based on the disk discrimination information to be recorded on the magneto-optical disk 1. The laser power control circuit 24 modulates the power of the laser of the pickup 21.

The magnetic head 26 applies an external magnetic field to the magneto-optical disk 1. The magnetic head 26 is arranged so as to face the pickup 21 and the objective lens 22 via the magneto-optical disk 1. The magnetic head 26 is controlled via the current drive circuit 27 by the system controller 25. The orientation of the magnetic field applied from the magnetic head 26 to the magneto-optical disk 1 is controlled by the current drive circuit 27 under the control of the system controller 25.

The spindle motor 31 rotates the magneto-optical disk 1 in accordance with an instruction of the system controller 25. The position of the magneto-optical disk 1 with respect to the center of rotation of the spindle motor 31 is monitored by a position sensor 32. A sled motor 33 moves the magneto-optical disk 1 in the disk radial (track) direction of the magneto-optical disk 1. Note that, in the magneto-optical disk discrimination information recording apparatus 20, it is sufficient that the magneto-optical disk 1 and the magnetic head 26 can relatively move in the radial direction of the magneto-optical disk 1. A configuration for moving the pickup 21 and the magnetic head 26 in the radial direction of the magneto-optical disk 1 can also be employed.

Note that the pickup 21 and the magnetic head 26 face each other across the magneto-optical disk 1 and are mechanically connected. When the pickup 21 is moved in the track direction by the sled motor 33, the magnetic head 26 simultaneously moves.

By focusing the modulated laser beam on the magneto-optical disk 1 while rotating the magneto-optical disk 1 by the spindle motor 31, one row of the mark element array is formed substantially concentrically with the center of rotation of the magneto-optical disk 1. While the magneto-optical disk 1 is rotating by one turn, the magneto-optical disk 1 is moved in the radial direction by the sled motor 33 while detecting the position of the magneto-optical disk 1 by the position sensor 32. Alternatively, the pickup 21 and the magnetic head 26 are moved in the radial direction of the magneto-optical disk 1. When the magneto-optical disk 1 is rotated by the spindle motor 31 and the modulated laser beam is focused on the magneto-optical disk 1, another row of the mark element array is further formed at a different radial position of the magneto-optical disk 1.

By sequentially forming the mark elements constituting the marks in the magneto-optical disk 1 spirally in this way, a stripe-shaped mark array is formed in the sub recording region 3 and the buffer region 4 of FIG. 1. The pitch of movement of the magneto-optical disk 1 (or the magnetic head 26) in the disk radial direction by the sled motor 33 is made smaller than the size of the mark elements on the magneto-optical disk 1.

By this, a plurality of mark elements are linked in the radial direction of the magneto-optical disk 1 to form individual marks constituting the mark array. Accordingly, even if several tracks worth of error occurs in the radial direction of the magneto-optical disk 1 at the reading position when reproducing the disk discrimination information in the tracking OFF state, the disk discrimination information can be reproduced.

When recording the disk discrimination information on the magneto-optical disk 1 by using the magneto-optical disk discrimination information recording apparatus 20 illustrated in FIG. 5 as described above, for example, by raising the laser power up to a power degrading the magnetism of the recording layer of the magneto-optical disk 1, it is also possible to form irreversible marks. Namely, it is known that when the temperature of the recording layer is raised to a temperature further higher than the Curie temperature, the magnetism disappears or is degraded and magnetic recording becomes impossible (refer to Japanese Patent No. 2771462). Accordingly, when reducing the magnetism of the recording layer of the magneto-optical disk 1 to such a state, it becomes no longer possible to form marks again.

In this case, if applying a uniform magnetic field to the magneto-optical disk 1 by for example the magnetic head 26 after forming the mark, the portions other than the marks will be magnetized in a uniform direction. Accordingly, it is possible to eliminate transition regions of magnetization near the marks and obtain a rectangular pulse-like signal having a small noise when reproducing the disk discrimination information from the magneto-optical disk 1. When forming the mark array by eliminating or degrading the magnetism of the recording layer, it is not necessary to initialize the recording layer to give a uniform magnetization direction before forming the marks.

When eliminating or degrading the magnetism of the recording layer to form the marks and then uniformly magnetizing portions other than the marks, the signal amplitude of the marks becomes in principle half that in comparison with the case of inverting the magnetization of a pre-initialized recording layer to form the marks. When inverting the magnetization of a pre-initialized recording layer, the orientation of magnetization becomes reverse between the marks and the portions other than this. Accordingly, the electro-optic Kerr rotation angle at the marks and the electro-optic Kerr rotation angle at the portions other than the marks become inverse in phase. Accordingly, the difference of these Kerr rotation angles, that is, the signal amplitude, can be made large.

On the other hand, when eliminating the magnetism at the mark portions, the Kerr rotation angle of the mark portions becomes 0 degree in principle. Accordingly, the signal amplitude detected by the differential detection method depends upon the Kerr rotation angle at the magnetized portions other than the marks and therefore becomes half of that of the case of reversing the magnetization between the mark portions and the portions other than the marks.

Further, when degrading the magnetism of the mark portions, while the Kerr rotation angle of the mark portions does not become 0 degree, it becomes a small value near 0 degree. Accordingly, the signal amplitude by the differential detection method becomes about half of that of reversing the magnetization between the mark portions and the portions other than that. Note that even when the signal amplitude becomes small in this way, since the portions other than the marks are uniformly magnetized, the noise component is suppressed. Accordingly, a good signal can be reproduced.

Figure 7:
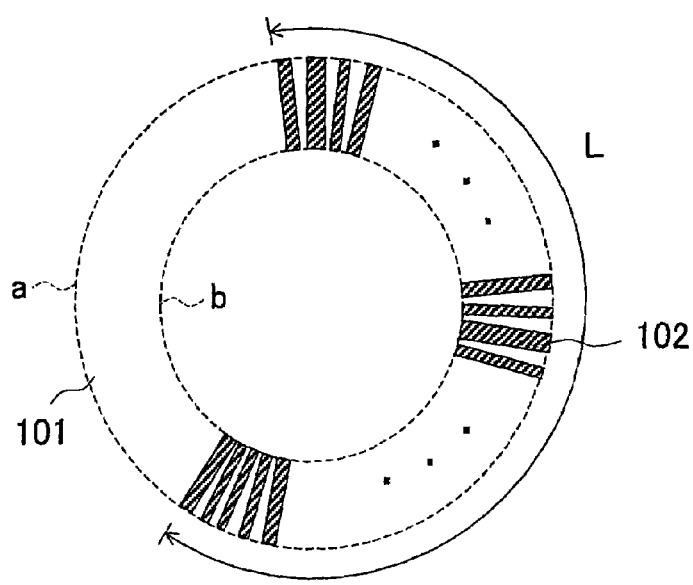
FIG. 7 is a schematic view of a mark array of disk discrimination information in a magneto-optical disk.
Figure 8:
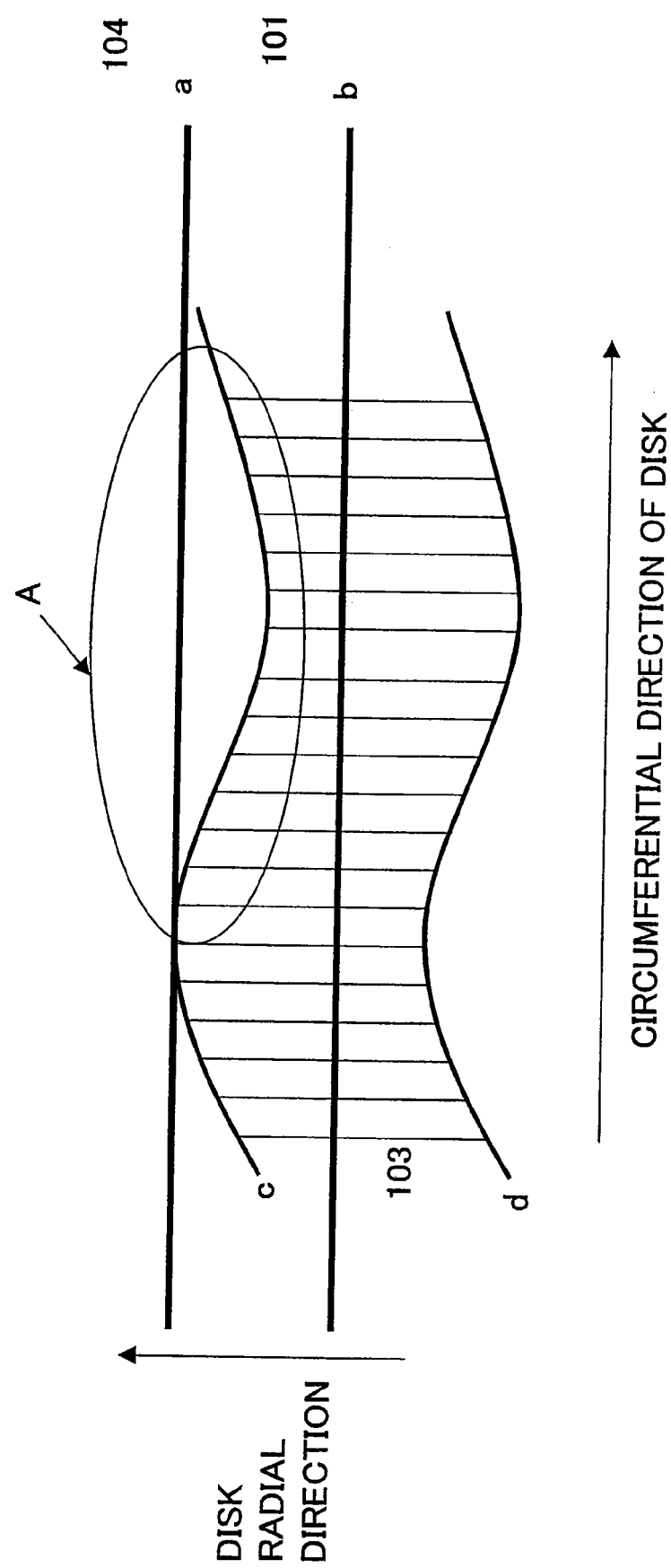
FIG. 8 is a view of a problem occurring in a mark array for recording disk discrimination information.

It is also possible to magnetize the mark portions a direction vertical to the film surface of the magnetic layer by using for example the magnetic head 26 instead of eliminating or degrading the magnetism of the mark portions. By focusing a high power laser beam from the pickup 21 and applying a magnetic field from the magnetic head 26 at portions where the magnetism is not eliminated or degraded, the disk discrimination information may be tampered with. Accordingly, one should select whether to eliminate or degrade the magnetism of the mark portions or to eliminate or degrade the magnetism of the portions other than the marks in accordance with for example the length of the stripe-shaped mark array in the circumferential direction of the magneto-optical disk 1 (refer to L of FIG. 7), the lengths of the individual marks in the circumferential direction of the disk, and the mark intervals. Note that it is also possible to record the disk discrimination information by the magnetic field modulation system.

Next, an explanation will be given of the method of reproduction of the disk discrimination information in comparison with the method of reproduction of the information recorded in the main recording region. In the magneto-optical disk 1 of the present embodiment, the disk discrimination information recorded in the sub recording region 3 and the buffer region 4 and the information recorded in the main recording region 2 can be reproduced by the same recording and reproducing apparatus.

When reproducing the disk discrimination information from the magneto-optical disk 1 of the present embodiment employing the MSR reproduction system, desirably the laser beam is focused with a power by which the temperature T2 of the second magnetic layer 13b does not become higher than the Curie temperature Tc2 of the second magnetic layer 13b (the power with which T2<Tc2 stands).

When the laser beam is focused with a power where T2≧Tc2 stands, the magneto-optical recording layer 13 enters a transitional state of magnetic domain expansion and reproduction. Due to this, noise appears in the reproduction signal of the disk discrimination information. In order to suppress this noise, desirably the laser power is set so that T2<Tc2 stands.

On the other hand, when reproducing information recorded on the main recording region 2, the laser beam is focused with a power by which the temperature T2 of the second magnetic layer 13b becomes higher than the Curie temperature Tc2 of the second magnetic layer 13b (a power with which T2≧Tc2 stands). Where T2<Tc2 stands, the orientation of the magnetization of the second magnetic layer 13b does not change, and no increase of a carrier level due to the magnetic domain expansion is seen.

Figure 6:
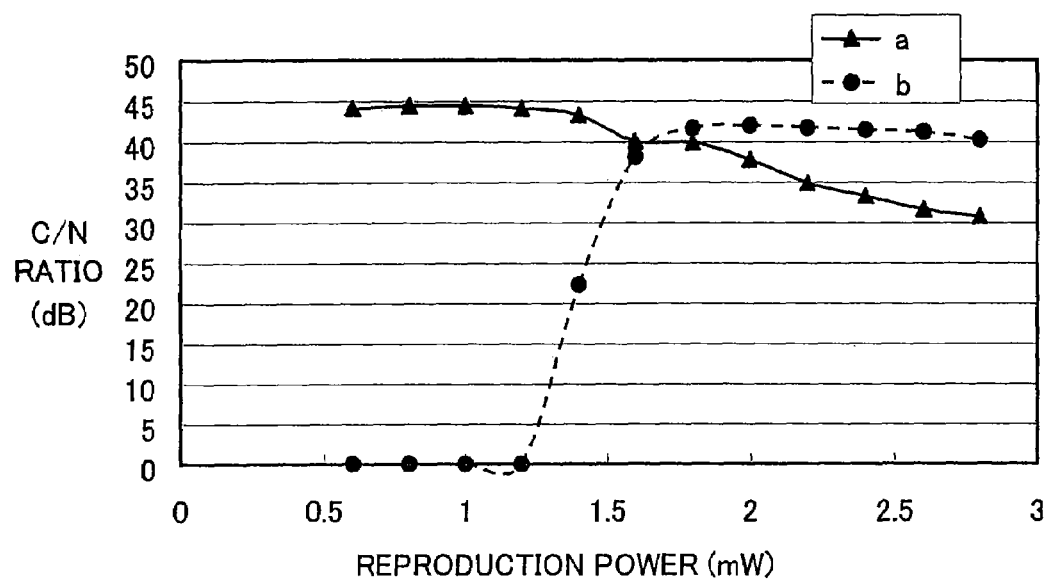
FIG. 6 is a view of a laser power dependency of a reproduction signal of the magneto-optical disk according to an embodiment of the present invention.

FIG. 6 shows a laser power dependency of the reproduction signal. In FIG. 6, the curve a indicates the laser power dependency of the marks for recording the disk discrimination information, and the curve b indicates the laser power dependency of the marks for recording information in the main recording region. The marks of the curve a have a length of 3 μm in the circumferential direction of the disk. The marks of the curve a are portions in which the magnetization is inverted with respect to the portions other than the marks. Namely, the recording layer is uniformly magnetized for initialization, then the magnetization is inverted at only the mark portions to form the marks. On the other hand, the marks of the curve b are marks of a length of 0.2 μm in the circumferential direction of the magneto-optical disk 1 and are reversibly recorded by the recording and reproducing apparatus of the magneto-optical disk, for example, the magneto-optical disk discrimination information recording apparatus 20 illustrated in FIG. 5.

As shown in FIG. 6, with the marks a of 3 μm, a high C/N ratio is obtained with a low laser power of about 1.4 mW or less, but when the laser power exceeds about 1.4 mW, the C/N ratio is gradually lowered. For the marks b of 0.2 μm, the signal of the information cannot be reproduced when the laser power is about 1.2 mW or less, but when the laser power is raised, the C/N ratio abruptly increases at about 1.4 mW. When the laser power becomes about 1.7 mW or more, the C/N ratio becomes almost constant.

In this example, since the C/N ratio of the marks b of 0.2 μm increases near 1.4 mW, it is considered that the second magnetic layer 13b reaches the Curie temperature Tc2 with the laser power of about 1.4 mW. Due to the second magnetic layer 13b reaching the Curie temperature Tc2, the effect of MSR appears, and the marks b of 0.2 μm are reproduced.

According to the magneto-optical disk of the above embodiment of the present invention, by effectively utilizing the space other than the main recording region, the area of the main recording region can be secured in a magneto-optical disk having the small-sized diameter. Accordingly, by a combination with the MSR reproduction system, an increase of the recording capacity can be realized even in a magneto-optical disk having a small-sized diameter.

Preferably, the mark array is formed meandering along the circumferential direction of the disk, and the size of the buffer region in the disk radial direction has at least the amplitude of the meandering. Further, preferably, the third information includes control data indicating physical attributes of the magneto-optical disk and recorded by pits or the wobbling groove. Further, preferably, the recording layer is constituted by at least three magnetic layers having different Curie temperatures. Due to this, the third information can be recorded and reproduced by effectively utilizing the space in which the mark array for recording the second information meanders. Further, the reproduction error of the second information due to the meandering of the mark array is prevented. Namely, according to the magneto-optical disk of the present invention, a magneto-optical disk having a small-sized diameter can be increased in recording capacity.

Further, according to the recording method and reproducing method and the recording and/or reproducing apparatus of the magneto-optical disk of the embodiment of the present invention using for example the magneto-optical disk discrimination information recording apparatus 20 illustrated in FIG. 5, it becomes possible to record and reproduce a magneto-optical disk having a small-sized diameter with a high recording density.

Namely, by providing a step of (means for) forming a track having a reflection ratio changing along a circumferential direction of the disk in a buffer region provided on an inner circumference side of the main recording region and recording the third information and a step of (means for) forming a stripe-shaped mark array in a sub recording region provided on the inner circumference side of the buffer region and recording the second information, wherein the step of (means for) recording the second information includes a step of (means for) rotating the magneto-optical disk and focusing pulse light on the magneto-optical disk in a tracking servo OFF state and a step of (means for) forming part of the meandering mark array in the buffer region and recording the second information in the buffer region overlapped with the third information, it becomes possible to record first information with a large recording capacity in a disk having a small-sized diameter. Further, it becomes possible to record disk discrimination information which can be used for the purpose of copyright protection in a disk having a small-sized diameter.

It is also possible to form the mark array by irreversibly eliminating or degrading magnetism in part of the recording layer or form it by inverting the magnetization in part of the recording layer initialized by uniform magnetization to magnetize it. While the second information is recorded in the tracking OFF state, in the main recording region, the tracking servo is applied for high density recording. Preferably, the third information is recorded by forming pits or wobbling grooves.

Further, by providing a step of (means for) reproducing first information recorded in the main recording region of the magneto-optical disk by focusing light having an intensity resulting in a temperature Tr of the recording layer becoming larger than Tc2 and a step of (means for) reproducing second information including disk discrimination information recorded in the sub recording region by focusing light having an intensity resulting in the temperature Tr of the recording layer becoming smaller than Tc2 and by reproducing the first information by control based on the reproduced second information, it becomes possible to reproduce first information recorded in the main recording region and second information recorded in the sub recording region and the buffer region under preferred conditions. Specifically, the first information is reproduced by utilizing the MSR reproduction system. On the other hand, the second information is reproduced with a low noise by differential detection not utilizing the MSR reproduction system. Accordingly, good reproducing characteristics are obtained. The reproduction of the first information is controlled and managed by the second information, so infringement of the copyright for the first information is prevented. Further, since the MSR reproduction system is utilized for the reproduction of the first information, the recording density of the main recording region can be raised and the magneto-optical disk can be increased in recording capacity.

Further, when the magneto-optical disk is recorded with third information including physical attributes of the magneto-optical disk, the second information recorded by a stripe-shaped mark array formed at part of the buffer region provided on the inner circumference side of the main recording region and a sub recording region provided on the inner circumference side of the buffer region is reproduced in a tracking servo OFF state and the third information recorded in the buffer region is reproduced by a modulation signal of a reflection ratio along a circumferential direction of the disk.

Preferably, the reproduced second information is used for control for the recording or reproduction of the first information in the main recording region.

Due to this, it becomes possible to perform the high density recording and record disk discrimination information even in a magneto-optical disk having a small-sized diameter. Accordingly, infringement of the copyright for the first information by illegal actions is prevented.

In this way, according to the recording method and reproduction method and the recording apparatus and the reproduction apparatus of the magneto-optical disk of the present invention, it becomes possible to record and reproduce a large amount of information by a magneto-optical disk having a small-sized diameter and to prevent illegal copying etc. by the utilization of the disk discrimination information.

The embodiments of the magneto-optical disk of the present invention and the recording and/or reproducing method and recording and/or reproducing apparatus of the same are not limited to the above explanation. For example, the size of the magneto-optical disk and the design etc. of the optical system used for the recording and reproduction can be appropriately changed. Further, the configuration of the magnetic layer can be appropriately changed in accordance with the MSR reproduction system etc. employed. Other than this, various modifications are possible within a range not out of the gist of the present invention.

What is claimed is:

1. A magneto-optical disk comprising:
 a recording layer made of a magnetic film having a magnetic anisotropy in a perpendicular direction to a surface of the magnetic film, said recording layer having (1) a main recording region for recording first information, (2) a sub recording region formed on an inner circumference side from said main recording region for recording second information including disk discrimination information, and (3) a buffer region formed between said main recording region and said sub recording region for recording third information, wherein,
said second information is recorded in a mark array formed in stripe shapes in a radial direction of said disk in said sub recording region and said buffer region,
a plurality of marks constituting said mark array are parts having a changed magnetization state in said recording layer, and
said third information can be reproduced by a modulation signal of a reflection ratio along a circumferential direction of the magneto-optical disk.

2. A magneto-optical disk as set forth in claim 1, wherein each one of said marks is formed by irreversible elimination or degradation of the magnetism of said recording layer.

3. A magneto-optical disk as set forth in claim 1, wherein each one of said marks is formed by inverting the magnetization of said recording layer.

4. A magneto-optical disk as set forth in claim 1, wherein said mark array is formed in a meandering shape along the circumferential direction of the disk and a size of said buffer region in the disk radial direction has at least the amplitude of said meandering shape.

5. A magneto-optical disk as set forth in claim 4, wherein: each one of said marks comprises a plurality of mark elements formed connected in at least a radial direction of said magneto-optical disk, said mark array comprises a plurality of mark element arrays formed substantially concentrically, and said mark element arrays comprise pluralities of mark elements formed along a circumferential direction of said magneto-optical disk.

6. A magneto-optical disk as set forth in claim 5, wherein: each said mark element is formed by focusing pulse light having a predetermined beam shape, each said mark element array is formed by focusing said pulse light at a predetermined position while rotating said magneto-optical disk, said mark element arrays are formed by focusing said pulse light at different positions from each other, and an amplitude of meandering includes an offset of an actual center of rotation of said magneto-optical disk and an ideal center axis of said magneto-optical disk.

7. A magneto-optical disk as set forth in claim 6, wherein said meandering is caused by at least eccentricity of said magneto-optical disk.

8. A magneto-optical disk as set forth in claim 6, wherein said meandering is caused by at least wobbling of a shaft for rotating said magneto-optical disk.

9. A magneto-optical disk as set forth in claim 1, wherein said third information includes control data indicating physical attributes of said magneto-optical disk.

10. A magneto-optical disk as set forth in claim 1, wherein said third information is recorded by pits.

11. A magneto-optical disk as set forth in claim 1, wherein said third information is recorded by a wobbling groove.

12. A magneto-optical disk as set forth in claim 1, wherein: said first information is reproduced based on rotation of a polarization direction of light striking said main recording region, and said second information is reproduced based on rotation of a polarization direction of light striking at least one of said sub recording region and said buffer region.

13. A magneto-optical disk as set forth in claim 12, wherein: at least said first information is reproduced by heating part of said recording layer by focusing of light, said recording layer is a multiple layer film comprised of at least a first magnetization layer, a second magnetization layer, and a third magnetization layer stacked together, and among a Curie temperature Tc1 of said first magnetization layer, a Curie temperature Tc2 of said second magnetization layer, and a Curie temperature Tc3 of said third magnetization layer, a Curie temperature Tc2 of said second magnetization layer is the lowest.

14. A magneto-optical disk as set forth in claim 1, wherein: said sub recording region is formed to a radius of 14.5 to 15.7 mm, and said buffer region is formed to a radius of 15.7 to 16.0 mm.

15. A method for recording, on a magneto-optical disk having a main recording region in which first information is recorded, second information including disk discrimination information and third information including physical attributes of said magneto-optical disk, comprising:
a step of forming a track having a reflection ratio changing along a circumferential direction of said magneto-optical disk in a buffer region provided on an inner circumference side of said main recording region and recording said third information; and
a step of forming a stripe-shaped mark array in a sub recording region provided on the inner circumference side of said buffer region and recording said second information,
wherein
said step of recording the second information includes (1) a step of rotating said magneto-optical disk and focusing pulse light on said magneto-optical disk with a tracking servo in the OFF state and (2) a step of forming part of said meandering mark array in said buffer region and recording said second information in said buffer region overlapped with said third information.

16. A method of recording of a magneto-optical disk as set forth in claim 15, wherein said step of forming said mark array includes a step of irreversibly eliminating or degrading magnetism in part of said recording layer.

17. A method of recording of a magneto-optical disk as set forth in claim 16, further comprising a step of irreversibly eliminating or degrading magnetism in part of said recording layer, then uniformly magnetizing the parts of said recording layer not irreversibly eliminated or degraded in magnetism.

18. A method of recording of a magneto-optical disk as set forth in claim 15, wherein said step of forming said mark array includes: a step of uniformly magnetizing said recording layer and a step of inverting the magnetization in part of the recording layer to magnetize it.

19. A method of recording of a magneto-optical disk as set forth in claim 15, further comprising the step of recording said first information in said main recording region with the tracking servo control in the ON state.

20. A method of recording of a magneto-optical disk as set forth in claim 15, wherein said step of recording said third information includes a step of forming pits at said buffer region.

21. A method of recording of a magneto-optical disk as set forth in claim 15, wherein said step of recording said third information includes a step of forming a wobbling groove at said buffer region.

22. A method of recording of a magneto-optical disk as set forth in claim 15, wherein said step of recording said second information is performed with the tracking servo control in the ON state.

23. A method of reproduction of a magneto-optical disk having a recording layer comprised of at least a first magnetization layer, a second magnetization layer, and a third magnetization layer successively stacked from a light focusing side, formed with a main recording regions, a sub recording region and a buffer region in said recording layer, and having a Curie temperature Tc2 of said second magnetization layer lowest among a Curie temperature Tc1 of said first magnetization layer, a Curie temperature Tc2 of said second magnetization layer, and a Curie temperature Tc3 of said third magnetization layer, comprising:

a step of reproducing first information recorded in said main recording region by focusing light having an intensity resulting in a temperature Tr of the recording layer becoming larger than Tc2; and a step of reproducing second information including disk discrimination information recorded in said sub recording region and said buffer region by focusing light having an intensity resulting in the temperature Tr of said recording layer becoming smaller than Tc2, said first information being reproduced by control based on said reproduced second information.

24. A method of reproduction from a magneto-optical disk as set forth in claim 23, wherein said step of reproducing first information includes a step of heating part of said recording layer by focusing of light and detecting a rotation of the polarization direction of said light.

25. A method of reproduction from a magneto-optical disk as set forth in claim 23, wherein said step of reproducing second information includes a step of detecting rotation of the polarization direction of said light.

26. A method of reproduction from a magneto-optical disk having a main recording region in which first information is recorded and having recorded second information including disk discrimination information of said magneto-optical disk and third information including physical attributes of said magneto-optical disk, comprising:

a step of reproducing said second information recorded in a stripe-shaped mark array formed at part of the buffer region provided on the inner circumference side of said main recording region and of a sub recording region provided on the inner circumference side of said buffer region with a tracking servo control in the OFF state; and a step of reproducing said third information recorded in said buffer region by a modulation signal of a reflection ratio along a circumferential direction of the disk.

27. A method of reproduction from a magneto-optical disk as set forth in claim 26, further comprising the step of control according to said reproduced second information to record or reproduce said first information in said main recording region.

28. A method of reproduction from a magneto-optical disk as set forth in claim 26, wherein said step of reproducing second information is performed with a focus servo control applied.

29. A method of reproduction from a magneto-optical disk as set forth in claim 26, wherein said step of reproducing third information includes a step of reproducing said third information recorded in said buffer region overlapped on said second information.

30. A method of reproduction from a magneto-optical disk as set forth in claim 26, wherein said step of reproducing second information includes a step of detecting rotation of a polarization direction of said light.

31. A method of reproduction from a magneto-optical disk as set forth in claim 27, wherein said step of reproducing first information includes a step of heating part of said recording layer by focusing of light and detecting a rotation of the polarization direction of said light.

32. A method of reproduction from a magneto-optical disk as set forth in claim 27, wherein said step of recording or reproducing the first information is carried out with the tracking servo control in the ON state.

33. An apparatus for recording a data on a magneto-optical disk having a recording layer made of a magnetic film having magnetic anisotropy in a perpendicular direction to a surface on the magnetic film, said recording layer having (1) a main recording region for recording first information, (2) a sub recording region formed on an inner circumference side from said main recording region and recording second information including disk discrimination information, and (3) a buffer region formed between said main recording region and said sub recording region and recording third information, said second information is recorded in a form of a mark array formed in stripe shapes in said sub recording region and said buffer region, a plurality of marks constituting said mark array being parts changed in magnetization state of said recording layer, and said third information can be reproduced by a modulation signal of a reflection ratio along a circumferential direction of the magneto-optical disk, said second information including disk discrimination information and third information including physical attributes of said magneto-optical disk, comprising:

a track forming unit for forming a track having a reflection ratio changing along a circumferential direction of the disk in a buffer region provided on an inner circumference side of the main recording region and recording the third information;

an array forming unit for forming a stripe-shaped mark array in a sub recording region provided on the inner circumference side of the buffer region and recording the second information; and a recording unit for recording the second information includes a rotating unit for rotating the magneto-optical disk and focusing pulse light on the magneto-optical disk with a tracking servo control in the OFF state, and a mark array forming unit for forming part of the meandering mark array in the buffer region and recording the second information in the buffer region overlapped with the third information.

34. An apparatus for recording a data on a magneto-optical disk as set forth in claim 33, wherein said unit for forming a mark array irreversibly eliminates or degrades the magnetism at part of said recording layer.

35. An apparatus for recording a data on a magneto-optical disk as set forth in claim 34, wherein said unit for forming a mark array irreversibly eliminates or degrades magnetism in part of said recording layer, then uniformly magnetizes the parts of said recording layer not irreversibly eliminated or degraded in magnetism.

36. An apparatus for recording a data on a magneto-optical disk as set forth in claim 33, wherein said unit for forming said mark array uniformly magnetizes said recording layer and inverts the magnetization in part of the recording layer to magnetize it.

37. An apparatus for recording a data-on a magneto-optical disk as set forth in claim 33, further comprising a unit for recording said first information in said main recording region with the tracking servo control in the ON state.

38. An apparatus for recording a data on a magneto-optical disk as set forth in claim 33, wherein said unit for recording said third information forms pits at said buffer region.

39. An apparatus for recording a data on a magneto-optical disk as set forth in claim 33, wherein said unit for recording said third information includes a step of forming a wobbling groove at said buffer region.

40. An apparatus for recording a data on a magneto-optical disk as set forth in claim 33, wherein said unit for recording second information operates with the tracking servo control in the ON state.

41. An apparatus for reproducing a data from a magneto-optical disk having a recording layer comprising at least a first magnetization layer, a second magnetization layer, and a third magnetization layer successively stacked from a light focusing side, formed with a main recording region, a sub recording region and a buffer region in said recording layer, and having a Curie temperature Tc2 of said second magnetization layer lowest among a Curie temperature Tc1 of said first magnetization layer, a Curie temperature Tc2 of said second magnetization layer, and a Curie temperature Tc3 of said third magnetization layer, comprising:

a reproducing unit for reproducing first information recorded in said main recording region by focusing light having an intensity resulting in a temperature Tr of the recording layer becoming larger than Tc2, and a reproducing unit for reproducing second information including disk discrimination information recorded in said sub recording region and in said buffer region by focusing light having an intensity resulting in the temperature Tr of said recording layer becoming smaller than Tc2, said first information being reproduced by control based on said reproduced second information.

42. An apparatus for reproducing information from a magneto-optical disk as set forth in claim 41, wherein said unit for reproducing first information heats part of said recording layer by focusing of light and detects a rotation of the polarization direction of said light.

43. An apparatus for reproducing information from a magneto-optical disk as set forth in claim 41, wherein said unit for reproducing second information detects rotation of the polarization direction of said light.

44. An apparatus for reproducing of information from a magneto-optical disk having a recording layer made of a magnetic film having magnetic anisotropy in a perpendicular direction to a surface on the magnetic film, said recording layer has a main recording region for recording first information, a sub recording region formed on an inner circumference side from said main recording region and recording second information including disk discrimination information, and a buffer region formed between said main recording region and said sub recording region and recording third information, said second information is recorded in a form of a mark array formed in stripe shapes in said sub recording region and said buffer region, a plurality of marks constituting said mark array being parts having a changed magnetization state in said recording layer; and said third information can be reproduced by a modulation signal of a reflection ratio along a circumferential direction of the magneto-optical disk, comprising:

a means reproducing unit for reproducing said second information recorded by a stripe-shaped matrix array formed at part of said buffer region provided at the inner circumference side of the main recording region and said sub recording region provided at the inner circumference side of said buffer region in a state with no tracking servo control applied, and a reproducing unit for reproducing said third information recorded at said buffer region by a modulation signal of a reflection ratio along the circumferential direction of said magneto-optical disk.

45. An apparatus for reproduction of a magneto-optical disk as set forth in claim 44, further comprising a unit for control according to said reproduced second information to record or reproduce said first information in said main recording region.

46. An apparatus for reproduction of a magneto-optical disk as set forth in claim 44, wherein said unit for reproducing second information operates with the focus servo control in the ON state.

47. An apparatus for reproducing information from a magneto-optical disk as set forth in claim 44, wherein said unit for reproducing third information reproduces said third information recorded in said buffer region overlapped on said second information.

48. An apparatus for reproducing information from a magneto-optical disk as set forth in claim 44, wherein said unit for reproducing second information detects rotation of a polarization direction of said light.

49. An apparatus for reproducing information from a magneto-optical disk as set forth in claim 44, wherein said unit for reproducing first information heats part of said recording layer by focusing of light and detects a rotation of the polarization direction of said light.

50. An apparatus for reproducing information from of a magneto-optical disk as set forth in claim 44, wherein said unit for recording or reproducing the first information operates with the tracking servo control in the ON state.

\* \* \* \* \*